Figure 1:
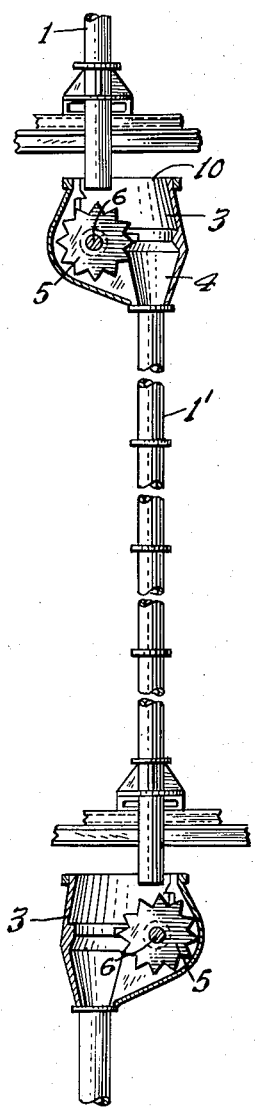

Jan. 24, 1961 B. FURMÁNEK ET AL 2,969,192
CASCADE CHUTE FOR TRANSPORTING PACKING MATERIAL
Filed March 12, 1958 2 Sheets-Sheet 1

INVENTORS.
Bohumír Furmánek
BY Jindřich Holešovský
Walter Wittich

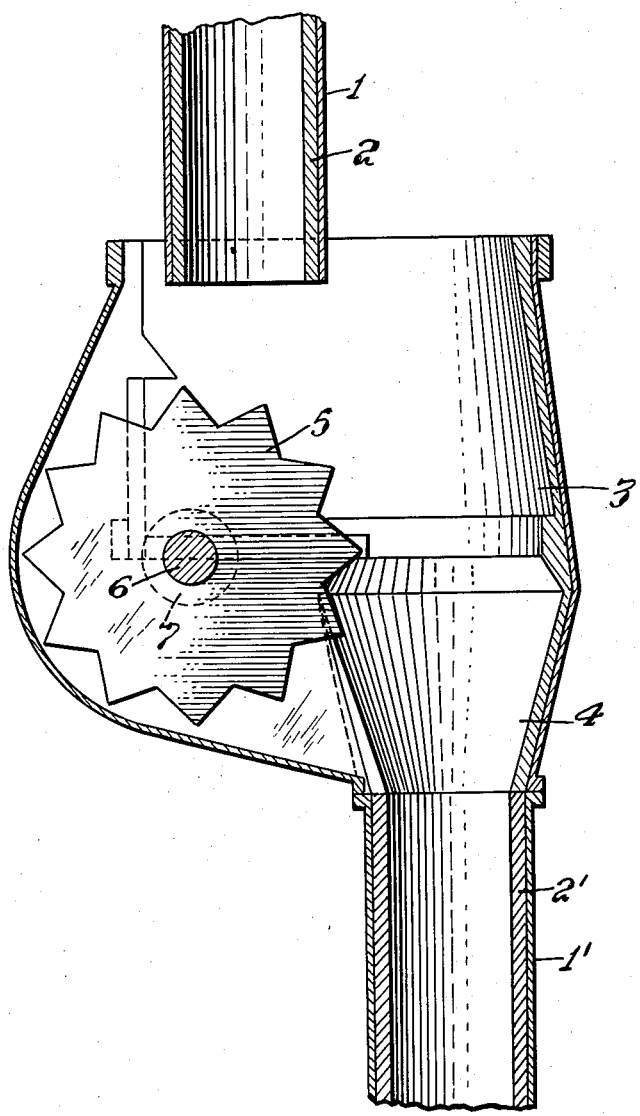

United States Patent Office 2,969,192
Patented Jan. 24, 1961

2,969,192

CASCADE CHUTE FOR TRANSPORTING PACKING MATERIAL

Bohumír Furmánek, 24/9 Blok, Havirov II; Jindřich Holešovský, 17/1986 Liebknechtova, Prague XVI; and Walter Wittich, 7 Sprasova, Ostrava IX, all of Czechoslovakia Filed Mar. 12, 1958, Ser. No. 720,858

Claims priority, application Czechoslovakia Aug. 14, 1957

4 Claims. (Cl. 241—154)

In the operation of mines it is in most cases advisable to fill the worked-out parts of mines with packing material, for example, with gangue which has been previously brought to the surface and which otherwise would have to be stowed at some place on the surface. The transportation of this packing material into the worked parts of the mine is as a rule accomplished by special chutes, which are often perpendicular or nearly perpendicular or which are arranged along a spiral line. Spiral chutes require less maintenance and attendance and have a greater capacity, but they are more expensive and require more space. If designed for high flow velocity to prevent choking, the spiral chutes wear out rapidly. Perpendicular tubular chutes suffer equally from excessive wear and frequent choking.

Some improvements have been achieved by lining the chute walls with fused basalt blocks, which provide better wear resistance. However, the disadvantage of frequent choking remains.

To check or reduce the velocity of the falling packing material in vertical chutes, so called cascade chutes have been designed, where the perpendicular tubular chutes are divided into sections which are staggered, so that the falling packing material travels along a zig zag path. Lodges of dirt form on the steps between adjacent chute sections acting as buffers for the falling material.

It is an object of this invention to provide a cascade chute for transporting packing material from an elevated place in a mine or from the earth's surface thereabove to the place of stowage, and which is not subject to excessive wear, reduces the danger of choking, allows easy maintenance and clearing of a choked section and which has reasonable initial and maintenance costs.

An illustrative embodiment of the invention is shown by way of example in the accompanying drawings, where Fig. 1 is a vertical cross section of a part of a cascade chute, Fig. 2 is an enlarged vertical cross section of a chamber arranged between two adjacent sections of the chute.

Each section of the chute comprises a tube 1 lined with fused basalt 2 and opening, at its lower end, into a chamber 3. The following or next lower tubular section extends downwardly from the chamber 3 at a certain lateral distance or offset from the axis of the upper section. It is possible to coaxially arrange all even sections and all odd sections of the chute, so that the packing material has to follow a zig zag path. Each chamber 3 (see Fig. 2) is open at the top 10. A horizontal shaft 6 is provided in the chamber 3, with one or more parallel indented or toothed crushing wheels 5 being freely rotatable on shaft 6. The bearings 7 of the shaft 6 are carried by the sides of chamber 3, with the horizontal axis of the shaft 6 being perpendicular to the vertical plane containing the axes of the tube sections 1 and 1'. The lower part of the chamber 3 extends into a hopper 4 to the lower end of which the following tube section 1' is attached, and the latter is also provided with a lining of fused basalt.

The axis of the shaft 6 is spaced from the axis of the tube section 1 opening at its lower end into the chamber 3 in the direction away from the depending tube section 1' by a distance that is substantially smaller than the radius of the indented or toothed crushing wheels 5 on the shaft 6, so that a major portion of the packing material falling through the tube section 1 hits the peripheries of the toothed wheels 5 at locations spaced from the vertical plane passing through the axis of the shaft 6, so that the packing material tends to rotate wheels 5 in the clockwise direction, as viewed in Fig. 2, and simultaneously receives an impetus changing its course in the direction toward the axis of the lower tube section 1'. The kinetic energy of the falling packing material is thus partly used for crushing of this material by simultaneously changing the direction of movement thereof, and partly for rotating the wheels 5 which avoid jamming. The part of the chamber above the attached section 1' is left open, or it is only provided with a removable cover or grating, enabling a steady control of the chute sections from above.

There is a further possibility to arrange the chamber 3 so that it is angularly displaceable around the axis of the incoming chute section 1, whereby different attached chute sections 1' may be supplied with packing material and the packing material may be alternatively directed to different places.

The speed of the falling packing material is thus effectively reduced by striking the wheels 5 in each chamber 3, while such wheels are simultaneously rotated for crushing larger pieces of this material.

The chambers 3 are arranged at suitable places of the mine, particularly at the different horizontal levels of the mine, to permit easy access for effective control of the whole operation.

The cross section of the tubular chute sections may be either circular or of any other suitable shape.

What we claim is:

1. A cascade chute for transporting packing material from a relatively high location to worked-out levels of a mine, comprising a series of substantially vertical tube sections arranged with the axes of adjacent tube sections spaced apart in the horizontal direction, means defining chambers between said adjacent tube sections with the lower end of the tube section above each chamber opening into the latter and with each chamber opening into the next lower tube section, and at least one toothed wheel rotatable in each chamber below said lower end of the tube section thereabove and having its axis of rotation extending perpendicular to the vertical plane containing the axes of the related adjacent tube sections, said axis of rotation of the toothed wheel being spaced horizontally from the axis of the tube section thereabove in the direction away from the axis of the next lower tube section by a distance less than the radius of said toothed wheel so that packing material falling from said lower end of a tube section into a chamber strikes the periphery of a toothed wheel in the latter and rotates the toothed wheel in the direction toward the next lower tube section, whereby the downward velocity of the packing material is reduced by contact with the toothed wheels in said chambers and large pieces of the packing material are broken-up by said toothed wheels to avoid jamming in said tube sections.

2. A cascade chute as in claim 1; wherein said tube sections are alternately arranged coaxial with two parallel, spaced apart vertical axes.

3. A cascade chute as in claim 1; wherein said means defining each chamber includes a housing having an opening at the top thereof above said next lower tube section to facilitate the release of any packing material clogging said next lower tube section.

4. A cascade chute for transporting packing material from a relatively high location to worked-out levels of a mine, comprising a series of substantially vertical tube sections arranged with the axes of adjacent tube sections spaced apart in the horizontal directions, means defining chambers between said adjacent tube sections with the lower end of the tube section above each chamber opening into the latter and with each chamber opening into the next lower tube section, and at least one toothed wheel rotatable in each chamber below said lower end of the tube section thereabove and having its axis of rotation extending perpendicular to the vertical plane containing the axes of the related adjacent tube sections, said toothed wheel extending laterally beyond the tube section thereabove in the direction toward the axis of the next lower tube section with said axis of rotation of the toothed wheel being spaced horizontally from the axis of the tube section thereabove in the direction away from the axis of the next lower tube section so that packing material falling from said lower end of a tube section into a chamber strikes the periphery of a toothed wheel in the latter and rotates the toothed wheel in the direction toward the next lower tube section, whereby the downward velocity of the packing material is reduced by contact with the toothed wheels in said chambers and large pieces of the packing material are broken up by said toothed wheels to avoid jamming in said tube sections.

References Cited in the file of this patent

UNITED STATES PATENTS

| | | |
|---|---|---|
| 670,222 | Campbell | Mar. 19, 1901 |
| 846,751 | Melvin | Mar. 12, 1907 |
| 1,407,330 | Hiller | Feb. 21, 1922 |
| 2,038,374 | Mansfield | Apr. 21, 1936 |
| 2,765,894 | Craig | Oct. 9, 1956 |